United States Patent
Varekamp (10) Patent No.: US 12,483,685 B2
(45) Date of Patent: Nov. 25, 2025

(54) SELF-CALIBRATION FOR HYBRID CAMERA ARRAYS

(71) Applicant: KONINKLIJKE PHILIPS N.V., Eindhoven (NL)

(72) Inventor: Christiaan Varekamp, Veldhoven (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 18/862,537

(22) PCT Filed: Apr. 23, 2023

(86) PCT No.: PCT/EP2023/060553
§ 371 (c)(1),
(2) Date: Nov. 3, 2024

(87) PCT Pub. No.: WO2023/213581
PCT Pub. Date: Nov. 9, 2023

(65) Prior Publication Data
US 2025/0280102 A1    Sep. 4, 2025

(30) Foreign Application Priority Data
May 4, 2022  (EP) ..................................... 22171650

(51) Int. Cl.
*H04N 13/282* (2018.01)
*G06T 3/40* (2006.01)
*G06T 7/579* (2017.01)
*G06T 7/80* (2017.01)
(Continued)

(52) U.S. Cl.
CPC ............. *H04N 13/282* (2018.05); *G06T 3/40* (2013.01); *G06T 7/579* (2017.01); *G06T 7/80* (2017.01); *H04N 13/111* (2018.05); *H04N 13/257* (2018.05); *G06T 2207/10024* (2013.01); *G06T 2207/10028* (2013.01)

(58) Field of Classification Search
CPC .. H04N 13/282; H04N 13/257; H04N 13/111; G06T 7/80; G06T 7/579; G06T 3/40; G06T 2207/10024; G06T 2207/10028
See application file for complete search history.

(56) References Cited

U.S. PATENT DOCUMENTS 10,706,584 B1 * 7/2020 Ye ........................ G06F 18/214
11,521,332 B1 * 12/2022 Chen ....................... G06T 7/248
(Continued)

OTHER PUBLICATIONS

International Search Report and Written Opinion from PCT/EP2023/060553 mailed Jul. 6, 2023.
(Continued)

*Primary Examiner* — Peter D Le (57) ABSTRACT

A method for calibrating a camera pose in a hybrid camera array comprising two or more color sensors and one or more depth sensors. The method comprises obtaining a depth map for each of the depth sensors, obtaining a set of images from the color sensors and generating up to scale camera poses for the color sensors and an up to scale point cloud using the set of images. A scaling of the up to scale camera poses and up to scale point cloud is then estimated using the one or more depth maps.

15 Claims, 5 Drawing Sheets

(51) Int. Cl.
  *H04N 13/111* (2018.01)
  *H04N 13/257* (2018.01)

(56) References Cited

U.S. PATENT DOCUMENTS

| | | | | |
|---|---|---|---|---|
| 2011/0115886 | A1* | 5/2011 | Nguyen | H04N 13/239 |
| | | | | 348/47 |
| 2012/0293635 | A1* | 11/2012 | Sharma | G06T 7/73 |
| | | | | 348/E13.004 |
| 2017/0243352 | A1* | 8/2017 | Kutliroff | G06T 19/006 |
| 2018/0130255 | A1* | 5/2018 | Hazeghi | H04N 13/271 |
| 2018/0203112 | A1* | 7/2018 | Mannion | H04R 1/406 |
| 2019/0278983 | A1* | 9/2019 | Iqbal | G06N 3/084 |
| 2019/0316912 | A1* | 10/2019 | Maggiore | G06F 9/453 |
| 2020/0372625 | A1* | 11/2020 | Dal Mutto | G06F 18/254 |
| 2023/0145498 | A1* | 5/2023 | Zhao | G06T 3/4046 |
| | | | | 382/162 |
| 2023/0339112 | A1* | 10/2023 | Yin | B25J 19/021 |
| 2024/0087094 | A1* | 3/2024 | Newman | H04N 13/271 |

OTHER PUBLICATIONS

Afzal Hassan et al: "RGB-D Multi-view System Calibration for Full 3D Scene Reconstruction" 18th International Conference on Pattern Recognition (ICPR' 06), IEEE Computer Society, US, Aug. 24, 2014 (Aug. 24, 2014), pp. 2459-2464.

Yoon Byung-Hyun et al: "Targetless Multiple Camera-LiDAR Extrinsic Calibration using Object Pose Estimation", 2021 IEEE International Conference on Robotics and Automation (ICRA), IEEE, May 30, 2021 (May 30, 2021), pp. 13377-13383.

Azure Kinect depth camera: https://docs.microsoft.com/en-us/azure/kinect-dk/depth-camera downloaded Aug. 6, 2024.

https://www.sony-depthsensing.com/content/uploads/2020/11/time-of-flight-explained.pdf downloaded Aug. 6, 2024.

Alicevision. Photogrammetric Computer Vision Framework [https://alicevision.org/] downloaded Aug. 6, 2024.

Colmap. [https://colmap.github.io/] downloaded Aug. 6, 2024.

* cited by examiner

SELF-CALIBRATION FOR HYBRID CAMERA ARRAYS

CROSS-REFERENCE TO PRIOR APPLICATIONS

This application is the U.S. National Phase application under 35 U.S.C. § 371 of International Application No. PCT/EP2023/060553, filed on Apr. 23, 2023, which claims the benefit of EP Patent Application No. EP 22171650.9, filed on May 4, 2022. These applications are hereby incorporated by reference herein.

FIELD OF THE INVENTION

The invention relates to the field of multi-view imaging. In particular, the invention relates to calibrating camera poses in hybrid camera arrays.

BACKGROUND OF THE INVENTION

Three-dimensional scene reconstruction with multiple cameras can benefit from the use of one or more depth sensors as part of a color camera array. Among the different depth sensing principles, indirect Time of Flight (iToF) has become popular.

A hybrid depth sensing device typically consists of a color camera, an infrared projection mechanism and a depth sensor camera built into a single device. Microsoft's Azure Kinect (TradeMark) is an example of such a device. Intrinsic parameters such as focal length, principal point, and lens distortion are typically provided by the manufacturer for both the color camera and the depth sensor. The extrinsic parameters that describe the relative position and rotation between the color and depth cameras of a single device are also provided. The devices are typically designed such that they minimize the baseline between the color sensor and the depth sensor inside the device in order to minimize parallax errors. This is important since, conventionally, the depth map is represented in the coordinates of the image sensor or vice versa.

Figure 1:
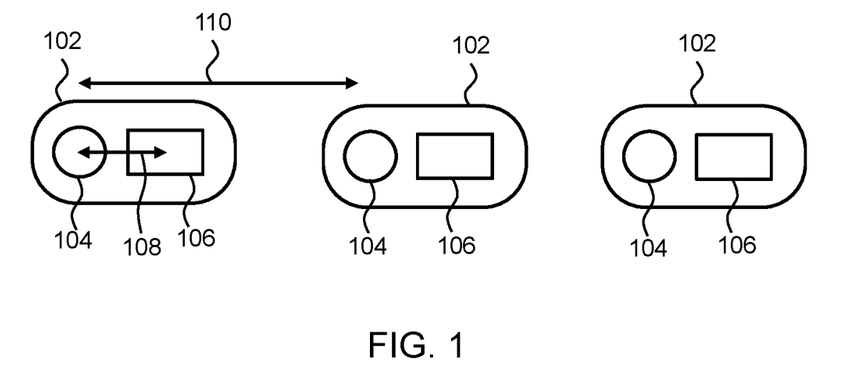
FIG. 1 shows an exemplary hybrid camera array.

FIG. 1 shows an exemplary hybrid camera array. The hybrid camera array comprises three hybrid devices 102. Each hybrid device 102 comprises a color sensor 104 and a depth sensor 106. The distance between the color sensor 104 and the depth sensor 106 of a hybrid device 102 (i.e. the baseline between these sensors) is shown by arrow 108. The distance between the color sensors 104 of two different devices (i.e. the baseline between color sensors) is shown by arrow 110.

When using a single hybrid device 102, the factory calibration will suffice for most applications. However, for applications where a scene needs to be captured from different directions, it is necessary to know the extrinsic parameters (rotation and translation) between multiple different hybrid devices 102. One approach could be to use a calibration pattern. However, this requires a calibration pattern which is not practical in most cases.

Another approach could be to use the depth maps for calibration. However, due to the lack of spatial detail and the presence of noise in the depth maps, such a geometry-based approach is not likely to be very precise.

Existing structure from motion algorithms that use visual feature point detection can provide self-calibration without the need for a calibration pattern using only the visual images from the color sensors. Many years of research has led to these structure from motion tools becoming very accurate and robust. However, structure from motion algorithms alone cannot solve the calibration problem of a hybrid camera array.

A first problem is that structure from motion relies on feature matching between views and hence the views need to be of the same modality (e.g., grey scale or color images). An input of images and depth maps into the structure from motion algorithm will not work since the features cannot be accurately matched across different modalities.

A second problem is that structure from motion provides calibration results (i.e. camera rotation and translation in a common coordinate system) only up to an ambiguous or unknown scale factor, with the same arbitrary dimensionless unit for the camera positions and the point cloud point positions. For many applications this is not a problem since the scale parameter is arbitrary and constructing a 3D geometric model such as a mesh and texturing that model does not require knowledge of scale. However, in a hybrid camera array that includes depth sensors providing depth maps in metric units (e.g., mm) this is a problem since we cannot use, for example, the depth at a given pixel in each depth camera and warp it to one of the cameras (color or depth) of another device. For this we would need to know the camera/device translations in metric units.

Thus, there is a need for a self calibration method which is accurate when used with hybrid camera arrays.

Afzal Hassan et al: "RGB-D Multi-view System Calibration for Full 3D Scene Reconstruction", 18th International Conference on Pattern Recognition, DOI: 10.1109/ICPR.2014.425, discloses combining bundle adjustment and iterative closest point algorithms to estimate pose parameters of cameras in a multi-view system.

Yoon Byung-Hyun et al: "Targetless Multiple Camera-LiDAR Extrinsic Calibration using Object Pose Estimation", 2021 IEEE International Conference on Robotics and Automation (ICRA), DOI: 10.1109/ICRA48506.2021.9560936, discloses calibrating extrinsic parameters among multiple cameras and a LIDAR sensor using object pose estimation.

SUMMARY OF THE INVENTION

The invention is defined by the claims.

According to examples in accordance with an aspect of the invention, there is provided a method for calibrating a camera pose in a hybrid camera array, the hybrid camera array comprising two or more color sensors and one or more depth sensors, the method comprising:
  obtaining a depth map for each of the one or more depth sensors and a set of images from the color sensors;
  generating up to scale camera poses for the color sensors and an up to scale point cloud using the set of images; and
  estimating a scaling of the up to scale camera poses and up to scale point cloud using the one or more depth maps.

The scaling may be used to calibrate the up to scale camera poses. In other words, the scaling may be used to obtain camera poses which can provide the real distances between the color sensors and/or depth sensors. The camera poses may be used subsequently for multi-view image/video coding and/or for novel view synthesis, for example.

The up to scale camera poses provide a rotation between the color sensors; and further provide a translation between the color sensors, but only up to an unknown scale factor. The up to scale point cloud provides a measure of depth from the set of images, but only up to an unknown scale factor. The depth maps provide a metric measure of depth—that is, depth values calibrated to real world units (e.g. mm). As such, it has been realized that the up to scale point cloud can be compared to the depth map to thereby estimate the scaling of the up to scale point cloud (and therefore of the up to scale camera poses).

Generating the up to scale camera poses and the up to scale point cloud may comprise inputting the set of images into a structure from motion algorithm, wherein the structure from motion algorithm is configured to output the up to scale camera poses for the color sensors and, optionally, the up to scale point cloud.

Structure from motion algorithms, or SfM algorithms, are commonly used to extract three dimensional structures from two dimensional images. For example, the movement of a color sensor can be deduced up to scale based on the images taken during the movement. Similarly, images of a scene from various color sensors at different positions can also be used instead of using the movement of a single color sensor The structure from motion algorithm may be configured to output both the up to scale camera poses and the up to scale point cloud. However, if the structure from motion algorithm does not output the up to scale point cloud or the output up to scale point cloud is not desirable, a new (or additional) up to scale point cloud can be obtained from the up to scale camera poses using, for example, feature detection and triangulation.

Estimating the scaling of the up to scale camera poses and the up to scale point cloud may comprise obtaining a plurality of proposed scales and, for each proposed scale: calculating proposed camera poses and a proposed point cloud by applying the proposed scale to the up to scale camera poses and up to scale point cloud respectively, comparing the proposed point cloud to the one or more depth maps and determining one or more error metrics based on the comparison. The scaling can be estimated based on the proposed scale with the lowest one or more error metrics.

This could be seen as a "for loop" implemented for various proposed scales where at least one error metric is determined for each proposed scale.

It will be appreciated that various methods exist for obtaining the plurality of proposed scales. In a first example, the proposed scales may be randomly assigned. In a second, preferred, example, an informed guess may be made for one or more of the proposed scales and the other values may be derived from nearby the informed guesses (e.g. +50%). Similarly, a "next" proposed scale in the loop used could be based on the error metrics of the previous proposed scales.

In a first comparison method, comparing the proposed point cloud to the one or more depth maps may comprise projecting the proposed point cloud to the views of the one or more depth sensors using the proposed camera poses, evaluating a plurality of depth-based errors between depth values in the one or more depth maps and the corresponding depth values resulting from projecting the proposed point cloud, wherein determining one of the error metrics is based on the plurality of depth-based errors.

The scaling can thus be found by minimizing the errors between the predicted depth associated with the projected points and the measured depth map. This has been found to greatly increase the accuracy and robustness of the estimated scaling.

In a second comparison method, comparing the proposed point cloud may comprise projecting the proposed point cloud to the views of the two or more color sensors using the proposed camera poses thereby to generate projected points, identifying depth map values of the one or more depth maps corresponding to feature points of the proposed point cloud, projecting the depth map values to the views of the two or more color sensors using the proposed camera poses and evaluating a plurality of pixel-based errors, in an imaging plane of each of the two or more color sensors, between the pixel coordinates resulting from projecting the depth map values and the pixel coordinates resulting from projecting the proposed point cloud, wherein determining one of the error metrics is based on the plurality of pixel-based errors.

Using pixel-based errors instead of depth-based errors is typically more intuitive to users. Additionally, the pixel-based based errors somewhat mimic the process of synthesizing novel views in multi-view imaging. This may provide improved results in the synthesis of novel views as the errors have already been minimized between existing views of the color sensors.

Estimating the scaling of the up to scale camera poses and up to scale point cloud may further comprise, for each proposed scale: determining whether one or one or more projected points in the projected point cloud are occluded in the view of any one of the depths sensors and/or the color sensors and based on a particular projected point being occluded, weighting the error corresponding to the particular projected point lower in the one or more error metrics.

Point clouds may include feature points of the back, or the side, of objects which are not visible from the view of the depth sensors. As such, the weighting of the occluded points is preferably lowered in the sum of errors.

For the first comparison method, determining whether one or more projected points in the projected point cloud are occluded may comprise determining whether the depth-based error between the depth of one or more of the projected points and the depth of the depth map exceeds a depth-based occlusion threshold.

For the second comparison method, determining whether one or more projected points in the projected point cloud are occluded may comprise determining whether the pixel-based error between the pixel coordinates of the projected points and the pixel coordinates of the depth map points exceeds a pixel-based occlusion threshold.

Determining whether one or more projected points in the projected point cloud are occluded may comprise identifying projected points within a local neighborhood of one or more central projected points and for each local neighborhood, determining whether the depth-based error and/or the pixel-based error exceed a neighborhood threshold, wherein the neighborhood threshold is optionally dependent on the depth of the identified projected points in the local neighborhood.

Determining whether one or more projected points in the projected point cloud are occluded may comprise, for each projected point: identifying a pixel color for each view of the one or more depth sensors and/or the two or more color sensors based on the set of images and comparing the pixel colors from each view.

Determining whether the projected points are occluded may comprise determining whether a difference between the pixel colors exceeds a pixel color threshold.

The method may further comprise generating a second point cloud using the one or more depth maps and, for each proposed scale: projecting the second point cloud to the views of the one or more depth sensors using the proposed camera poses and evaluating a second plurality of depth-based errors between depth values in the one or more depth maps and the corresponding depth values resulting from the projection of the second point cloud, wherein determining one of the error metrics is based on the second plurality of depth-based errors.

The different error metrics may be weighted based on one or more of: the number of points in the proposed point cloud, the number of points in the second proposed point cloud and a relative importance between the proposed point cloud and the second proposed point cloud.

The invention also provides a computer program product comprising computer program code which, when executed on a computing device having a processing system, cause the processing system to perform all of the steps of the afore-mentioned method.

The invention also provides a system for calibrating a camera pose in a hybrid camera array, the system comprising:
  a hybrid camera array comprising two or more color sensors and one or more depth sensors; and
  a processor configured to:
    obtain a depth map for each of the one or more depth sensors and a set of images from the color sensors;
    generate up to scale camera poses for the color sensors and an up to scale point cloud using the set of images; and
    estimate a scaling of the up to scale camera poses and up to scale point cloud using the one or more depth maps.

It will be appreciated that the processor of the system may be further configured to perform any of the afore-mentioned method steps.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for calibrating a camera pose in a hybrid camera array comprising two or more color sensors and one or more depth sensors. The method comprises obtaining a depth map for each of the depth sensors, obtaining a set of images from the color sensors and generating up to scale camera poses for the color sensors and an up to scale point cloud using the set of images. A scaling of the up to scale camera poses and up to scale point cloud is then estimated using the one or more depth maps.

Existing structure from motion software can output a point cloud as well as the expected camera poses (i.e., orientation and translation). Known packages with structure from motion software include Alice Vision and Colmap. This point cloud is typically used internally to solve the structure from motion problem in a process called bundle adjustment. The points in the point cloud correspond well with detectable features in the images.

Although this point cloud is also only known up to scale, it provides an unexpected alternative to the depth warping and image difference calculation approach. The points in this point cloud consists both of well matchable and distinctive features with sufficient local image texture variation. Moreover, since the points in the point cloud coincide with matching features over the multiple views, few occlusion features will present since those exist due to a combination of textures at different depth levels.

Based on this realization, it is proposed to solve the hybrid camera self-calibration problem by first running a structure from motion algorithm on the color images and then, as a second step, use the point cloud output by the structure from motion algorithm to determine the unknown scale parameter by comparing it with information from the depth map(s).

For a given scale, the point cloud can be first converted to a metric point cloud. The metric point cloud is then warped to all views that contain a depth map. The observed depth value, from the depth maps, is then compared to the depth value of the projected point in the view coordinates. The error metric is hence a geometric metric (instead of an image-based metric, for example).

Figure 2:
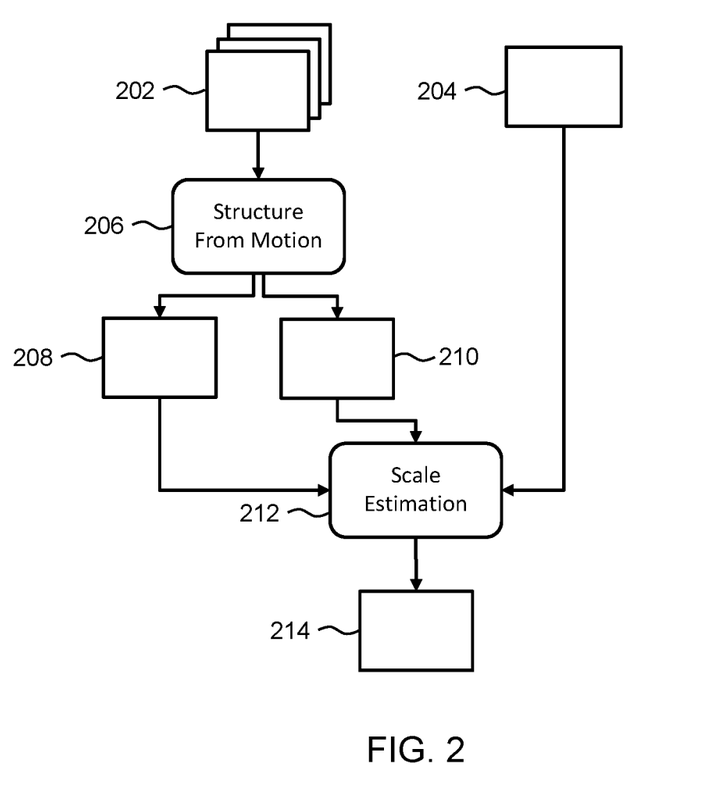
FIG. 2 shows a self-calibration process for a hybrid camera array.

FIG. 2 shows a self-calibration process for a hybrid camera array. A sequence of color images 202 is obtained from color sensors and depth maps 204 are obtained from depth sensors. A structure from motion algorithm 206 is used to estimate the scaled camera poses 208 of the color sensor, including rotation matrices $[R_1, \ldots, R_N]$ and up to scale translation vectors $[st_1, \ldots, st_N]$. The camera pose of a sensor can be used to warp images to other views. However, in order to warp images to a view corresponding to a different sensor, a scale-resolved, metric, translation vector $[t_1, \ldots, t_N]$ is needed.

The structure from motion algorithm 206 also outputs an up to scale point cloud $[sx_1, \ldots, sx_M]$ 210. This data can be passed to a scale estimation algorithm 212 that uses the metric depth map 204 to determine the scaling 214 of the up to scale camera poses and up to scale point cloud via a scale parameter s.

An exemplary scale estimation algorithm 212 has the following steps:
  1. Input-$[R_1, \ldots, R_N]$, $[st_1, \ldots, st_N]$ and $[sx_1, \ldots, sx_M]$.
  2. Input-Rough estimate of the average distance between color sensors.

3. Calculate an initial rough estimate of the scale parameter $s_{init}$ based on the input average distance between depth sensors.
4. For proposed scales s from $s=s_{start}=f_{start}s_{init}$ to $s=s_{stop}=f_{stop}s_{init}$ in steps of $\Delta s$, perform the following steps:
  4.1. Solve for $[x_1, \ldots, x_M]$ using proposed scale s.
  4.2. Solve for $[t_1, \ldots, t_N]$ using proposed scale s.
  4.3. Project $[x_1, \ldots, x_M]$ to depth sensors $[1, \ldots, N]$ using $[t_1, \ldots, t_N]$.
  4.4. Evaluate the following error metric:

$$E(s) \equiv \sum_{i=1}^{N} \sum_{j=1}^{M} e_j^{(i)}(s)$$

where:

$$-e_j^{(i)}(s) \equiv \left| z\left(u_j^{(i)}(s), v_j^{(i)}(s)\right) - \hat{z}_j^{(i)}(s) \right|$$

$\hat{z}_j^{(i)}(s)$ is the depth of projected point j from view i given proposed scale s.

$$z\left(u_j^{(i)}(s), v_j^{(i)}(s)\right)$$

is the depth map value from view i in the direction of point j.
$u_j^{(i)}(s)$ and $v_j^{(i)}(s)$ are the coordinates of the depth map at view i corresponding to projected point j.
5. Determine the value $s=s_{min}$ corresponding to the minimum of E(s).
6. Return the calibrated translation $[t_1, \ldots, t_N]$ corresponding to $s_{min}$.

The minimum of E(s) may be replaced with a threshold minimum $E_{min}$. In this case, if $E(s)<E_{min}$, the threshold minimum can be updated to the lower value.

Figure 3:
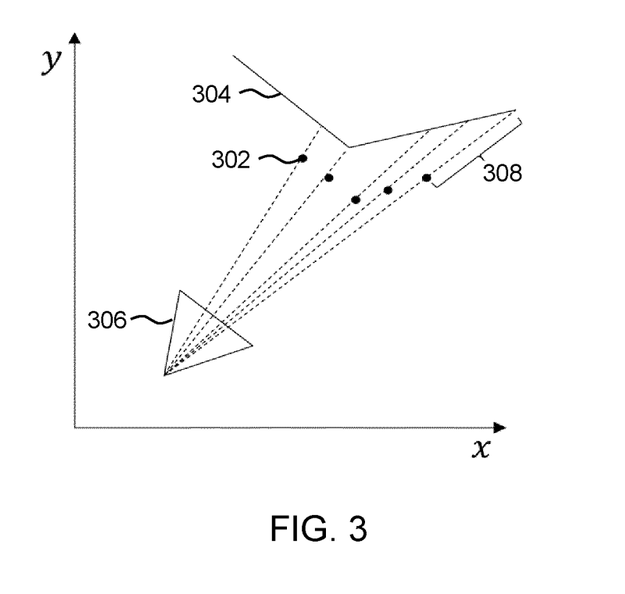
FIGS. 3 and 4 illustrate the scale estimation process using a single depth sensor and first and second scale parameters respectively.
Figure 4:
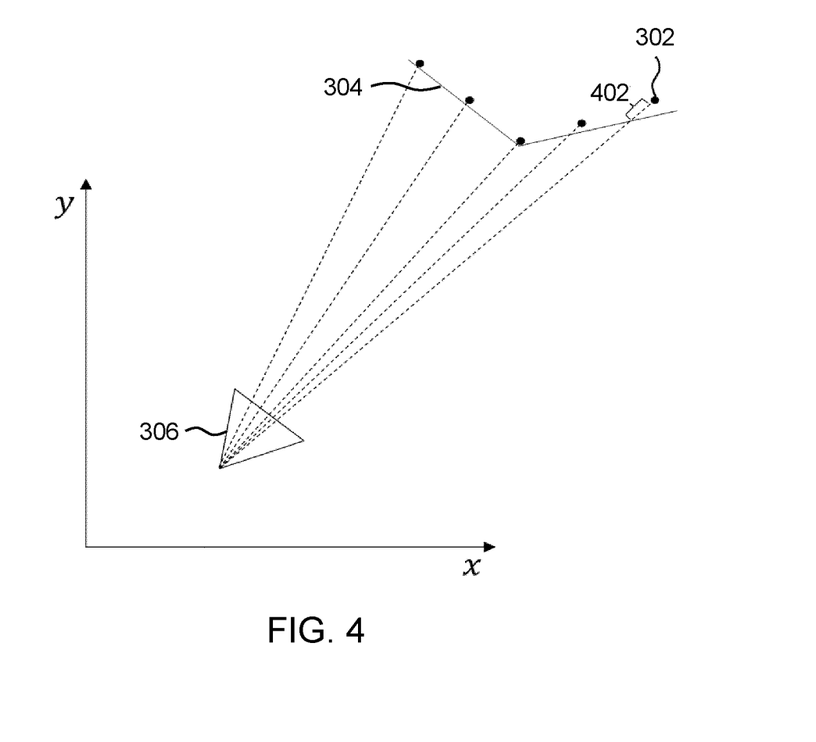

FIGS. 3 and 4 illustrate the scale estimation process using a single depth sensor 306 and first and second scale parameters respectively. Projected points 302 correspond to the cloud points projected to the depth sensor 306 using the corresponding scale parameter. Metric depth map 304 is the depth map observed by the depth sensor 306.

In FIG. 3, the first scale parameter selected is too small, thereby resulting in a large error 308 between the predicted depth of the projected points 302 and the observed depth at corresponding positions on the depth map 304. The corresponding positions on the depth map are the points on the depth map intersected by a vector formed by a projected point 302 and the origin of the depth sensor 306.

In FIG. 4, the second scale parameters selected, corresponding to a larger scaling, shows a smaller error 402 and thus provides a more accurate estimation of the metric translation vector.

Figure 5:
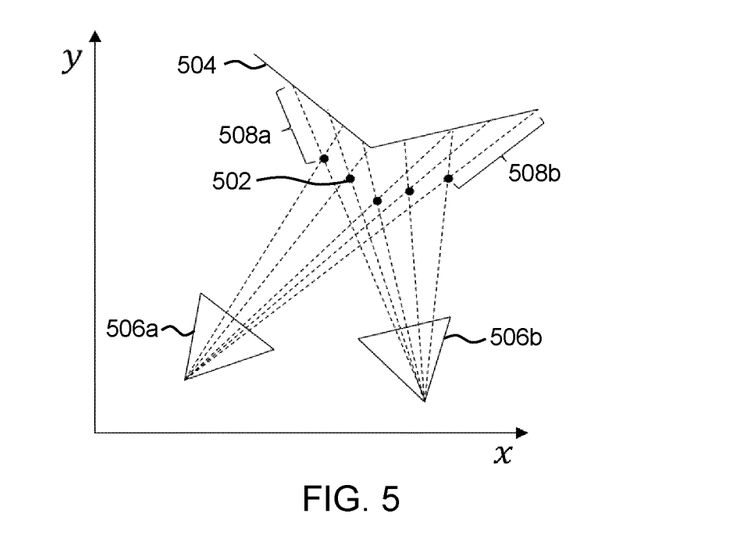
FIGS. 5 and 6 illustrate the scale estimation process using two depth sensors.
Figure 6:
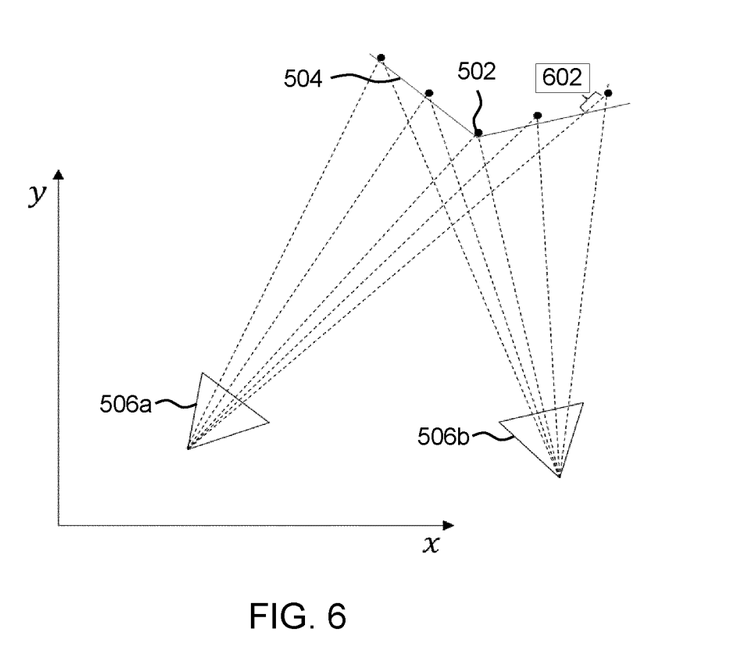

FIGS. 5 and 6 illustrate the scale estimation process using two depth sensors 506a and 506b. In this case, a plurality of first errors 508a between the projected points 502 and the depth map 504 from the first depth sensor 506a are calculated and a plurality of second errors 508b between the projected points 502 and the depth map 504 from the second depth sensor 506a are calculated. The plurality of first errors 508a and the plurality of second errors 508b are summed to determine the total error corresponding to each proposed scale s. Thus, the second depth sensor 506b now also contributes to the total error via its own observed depth map.

In FIG. 5, the scale parameter selected is too small, thereby resulting in a large errors 508a and 508b. In FIG. 6, the scale parameters selected shows smaller errors (only error 602 is visible) and thus provides a more accurate estimation of the metric translation vector.

Figure 7:
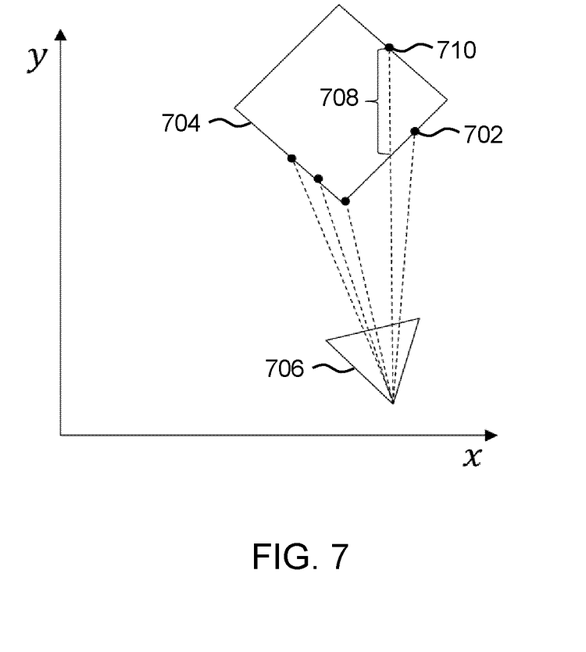
FIG. 7 illustrates the scale estimation process when dealing with occluded points.

FIG. 7 illustrates the scale estimation process when dealing with occluded points 710. Due to a point cloud being sparse, by definition, projected points 702 from the back of an object will falsely contribute to the error calculation. This can be seen in FIG. 7 where the projected point 710 corresponds to the back of an object represented by depth map 704. This may lead to a false error 708 between the point of the depth map visible to the depth sensor 706 and the projected point 710 contributing to the total error metric.

A solution may be to assume that objects have a minimum dimension and exclude errors that exceed a given occlusion threshold t (e.g. t=0.5 m). The corresponding error metric could thus be:

$$e_j^{(i)}(s) \equiv \begin{cases} 0 \text{ if } d_j^{(i)}(s) > t \\ d_j^{(i)}(s) \text{ otherwise} \end{cases}$$

where:

$$d_j^{(i)}(s) \equiv \left| z\left(u_j^{(i)}(s), v_j^{(i)}(s)\right) - \hat{z}_j^{(i)}(s) \right|.$$

Other approached for handling occlusion could also be used to suppress errors such as using local occlusion reasoning between points in the projected view.

Figure 8:
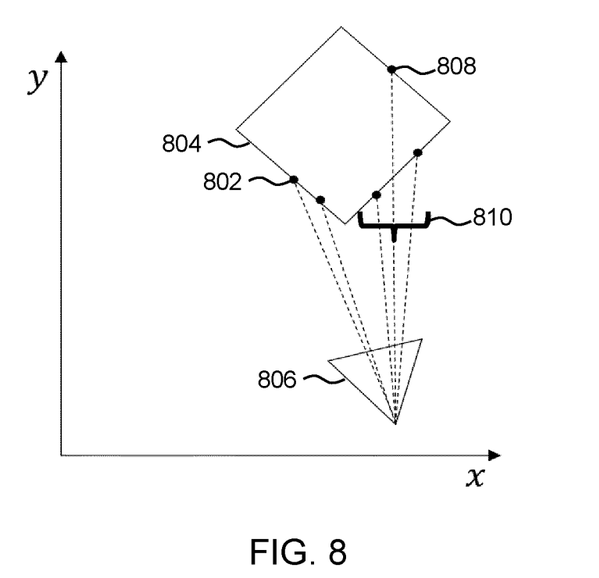
FIG. 8 illustrates occlusion handling in the scale estimation process using local neighborhoods.

FIG. 8 illustrates occlusion handling in the scale estimation process using local neighborhoods 810. A local neighborhood 810 is provided around a given projected point 808 chosen from the plurality of projected points 802. The local neighborhood 810 of a given projected point 808 can be defined as all other points that lie closer (measured in image space) than a given distance expressed in pixels (e.g., 10 pixels).

If the projected point 808 has a depth that is larger than a neighborhood threshold, compared to all neighboring points, then it can be concluded that the projected point 808 coincides with a point on the object which is not visible from the depth sensor 806 (e.g. the back of the object). Consequently, the error between the projected point 808 and the observed depth map 804 will not accumulate in the error sum.

Alternatively or additionally, pixel colors can be compared between views to determine whether, for a given view, a projected point is occluded or not.

Figure 9:
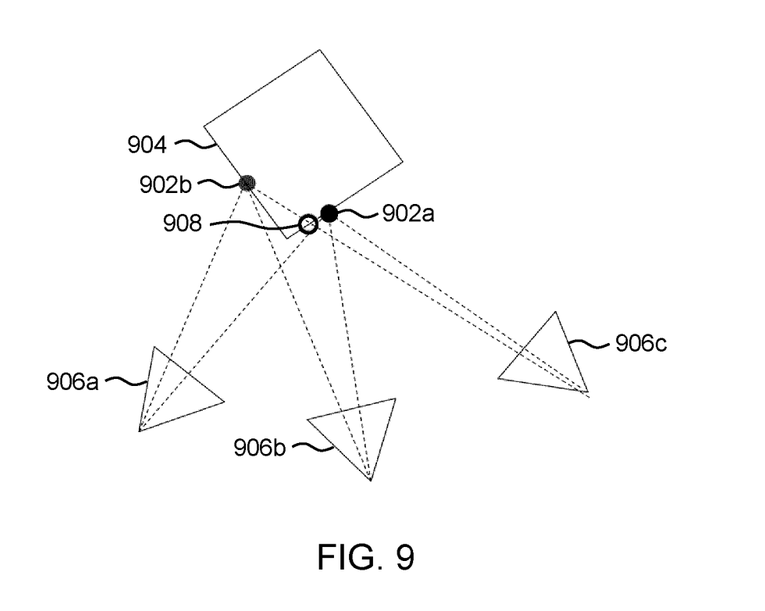
FIG. 9 illustrates occlusion handling in the scale estimation process using pixel color.

FIG. 9 illustrates occlusion handling in the scale estimation process using pixel color. If, for a given projected point in a given view, the observed color differs significantly from all color values observed in the other views (for the same projected point), the projected point is likely occluded and hence its contribution to the error sum can be reduced or fully removed. For, example, a weighting may be added to the error sum based on a pixel color comparison.

In FIG. 9, two projected points 902a and 902b are shown. Projected point 902a can be seen by all three depth sensors 906a, 906b and 906c and thus the corresponding pixel color (e.g. obtained by warping the color images from the color sensor to the depth sensors) should be similar from all three views. However, projected point 902b can be seen by depth sensors 906a and 906b but cannot be seen by depth sensor 906c. Thus, depth sensor 906c would "see" the pixel color of projected point 902b as being the color at point 908. As such, if the colors of points 902*b* and 908 do not match, the error of point 902*b* from depth sensor 906*c* could be ignored in the total error calculation.

Visual feature points (i.e. the points in the point cloud) output by structure from motion algorithm typically correspond with image regions that show spatial texture variation (e.g., corners). Image regions without much texture or texture variation will therefore not generate feature points and thus not be used in the scale estimation process.

To solve this problem, the observed depth maps could be used as a source for additional point cloud data. The depth maps for all views can be converted to a common world space coordinate system using the proposed scale and the camera poses. This gives a depth map-based point cloud with the size of the number of views times the number of depth map pixels per view. For a given proposed scale, two types of point clouds are now available: a scaled version of the point cloud provided by the structure from motion algorithm and a depth map derived point cloud.

Since both the origin and the number of points in each type of point cloud differ significantly, it may be advantageous to normalize each type by the number of points and weigh their contribution separately:

$$E_{total} = \alpha \frac{E_{structure\ from\ motion}}{N_{structure\ from\ motion}} + (1-\alpha)\frac{E_{depth\ maps}}{N_{depth\ maps}}$$

where α (between 0 and 1) weighs the relative importance of the point cloud provided by structure from motion. The particular value of α may be chosen by the skilled person (e.g. via experimentation and/or trial and error).

Returning to FIG. 1, the baseline 108 between the color sensor 104 and the depth sensor 106 in a hybrid device 102 may be known (e.g. from factory).

The baseline length 110 between the color sensors can be estimated. In practice, an average baseline length 110 between all color sensors can be estimated. The baseline length 110 can then be used to calculate a rough estimate of the scale parameter. A range of proposed scales, around the rough estimate of the scale parameter, can then be used in the scale estimation process as described above.

In an example, one can calculate a rough estimate of the scale parameter by dividing the estimated baseline length 110 by an average of the shortest distance between the camera poses. If the color sensors are somewhat uniformly spaced out in 3D space (i.e. the distance between the color sensors does not vary significantly), the rough estimate of the scale parameter may be within 10% of the real scale parameter. Thus, under the assumption of uniformly spaced out cameras, the range of proposed scales may be within 10% of the rough estimate. However, it will be appreciated that, in practice, such assumptions may not always be correct. Thus, it has been found that a sensible range of proposed scales may be within 50% of the rough estimate. Of course, the exact range may depend on the positioning of the color sensors, the processing resources available and the preferences of the skilled person.

The range of proposed scales comprises a plurality of proposed scales.

In an example, the rough estimate may be a guess (e.g. random or based on prior scales). However, this may require more iterations/a larger range of proposed scales and, in some cases, may diverge towards an erroneous scale.

As will be appreciated, the aforementioned error metric is based on depth-based error contributions. In other words, the error metric is based on differences in depth values. However, many users may be more familiar with pixel-based errors (e.g. distances in pixels). As such, a second solution is proposed where pixel-based errors are used to determine the error metric. A sum of residual pixel-based errors (after the optimal scale has been estimated) may be useful as a quality metric, regardless of whether a depth-based or pixel-based error metric was used to guide the selection of the optimal scale.

Figure 10:
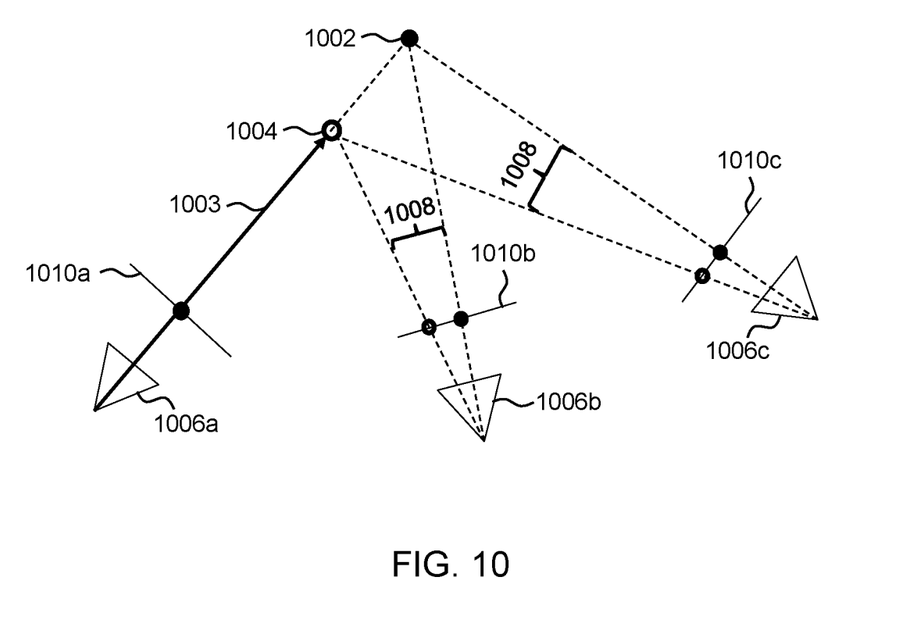
FIG. 10 illustrates the scale estimation process using pixel-based errors.

FIG. 10 illustrates the scale estimation process using pixel-based errors 1008. Feature point 1002 is a feature point of a proposed scale point cloud. Point 1004 is a point inferred from the depth map, by identifying the depth value 1003 corresponding to the line-of-sight to feature point 1002. This will be referred to as a depth map point. It has been "un-projected" into 3D space from the imaging plane 1010*a* of a first color sensor 1006*a* using the known depth value 1003 from the depth map. (Here, "un-projection" refers to a process of inferring a 3-D point from a depth value in a 2-D depth map.) As can be seen, the depth map point 1004 corresponds to the feature point 1002 from the view of the first color sensor 1006*a*.

Using the proposed camera poses of the color sensors 1006*a*, 1006*b* and 1006*c*, the depth map point 1004 and the feature point 1002 are re-projected to the imaging planes 1010*b* and 1010*c* corresponding to the second color sensor 1006*b* and third color sensor 1006*c* respectively.

Pixel-based errors 1008 can then be found between the re-projections of the feature point 1002 and the depth map point 1004 for both imaging planes 1010*b* and 1010*c*. Similarly to the depth-based approach, the pixel-based errors can be used to determine an error metric.

Thus, instead of comparing the predicted depth value after projection with the observed depth map value, this alternative pixel-based error approach projects the depth map point 1004 to various views where it then compares its pixel position with the direct projection of the corresponding point cloud point. This approach results in a total number of error contributions to the error metric equal to the number of feature points in the point cloud times the number of cameras minus one.

Since this error metric involves re-projecting points between views, it resembles the view synthesis process that is typically used during rendering of novel views in multi-view imaging. As such, minimizing a pixel-based error metric may provide further accurate renders of novel views as this should translate to the minimization in visible errors in the novel views.

Of course, one could also use both approaches to obtain different error metrics. These error metrics would comprise different dimensions (i.e. pixel distances and depth differences) and thus combining them may not be desirable unless they are appropriately weighted.

Similarly to the depth-based scale estimation, a second point cloud could also be calculated from the one or more depth maps and used to obtain more depth information of the scene. The use of the second point cloud could be used to determine a second depth-based error metric. It should be noted that the pixel-based error metric cannot be used as-is with a second point cloud that is calculated solely from depth map data. For the points in such a point cloud, there is no information about the correspondence of points between views. Therefore, it is not possible to perform a point-wise comparison. In contrast, the correspondence information is inherent in the point cloud generated by the structure-from-motion algorithm, since this a single "true"

3-D point cloud in 3-D coordinates, which is subsequently projected into the 2-D imaging plane of each sensor.

It will be appreciated that more than one error metric can be determined for a hybrid sensor array set up. The number of error metrics and type of error metric used may depend on the available processing resources and/or user preference.

It will be appreciated that any of the aforementioned occlusion handling approaches can also be used for the pixel-based scale estimation process with minimal changes. For example, the occlusion threshold may be based on distances in pixels instead of distances in metric measurements.

Another solution to the problem of self-calibration which has been considered is to first run a structure from motion algorithm on the color images and then use the depth map(s) to find the correct scale parameter. Theoretically, this could be achieved by warping a color image from one device to another based on the depth map and then taking an image difference measure (e.g., mean squared error). Minimizing this difference over all possible warps of one camera to the other cameras could then result in the best fit scale parameter.

However, this alternative approach may be more sensitive to noise in the depth map-especially for larger baselines. Furthermore, in some instances, the use of an image-based difference measure may cause a bias in the scale estimate, caused by varying surface reflectance resulting in color changes in the image. Additionally, this solution may be relatively more computationally intensive, since all pixels in all images need to be warped to all other images at each iteration in the search for the optimal scale. The alternative solution is likely to be most useful in cases where the baseline is relatively small and the depth maps are expected to have a low level of noise.

As previously discussed, a structure from motion algorithm can be used to obtain a point cloud. In some cases, the structure from motion algorithm will output the point cloud. However, in some cases, it may be preferable to determine a new up to scale point cloud for the scale estimation (optionally using the up to scale camera poses output by the structure from motion algorithm). For example, feature detection and matching can be applied to the set of images and triangulation can used, based on the on the up to scale camera poses, to obtain a new up to scale point cloud. The new up to scale point cloud could be used alone to estimate the scaling, or else it could be used to augment the point cloud from the structure-from-motion algorithm.

The skilled person would be readily capable of developing a processor for carrying out any herein described method. Thus, each step of a flow chart may represent a different action performed by a processor, and may be performed by a respective module of the processor.

As discussed above, the system makes use of processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

Functions implemented by a processor may be implemented by a single processor or by multiple separate processing units which may together be considered to constitute a "processor". Such processing units may in some cases be remote from each other and communicate with each other in a wired or wireless manner.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa.

Any reference signs in the claims should not be construed as limiting the scope.

The invention claimed is:

1. A method comprising:
obtaining a depth map from each of at least one depth sensors;
obtaining a plurality of images from at least two color sensors;
generating at least two up to scale camera poses for the at least two color sensors;
generating an up to scale point cloud using the plurality of images;
estimating a scaling of the at least two up to scale camera poses and up to scale point cloud using the at least one depth maps and
obtaining a plurality of proposed scales; for each proposed scale:
calculating at least two proposed camera poses and a proposed point cloud by applying the proposed scale to the at least two up to scale camera poses and up to scale point cloud respectively;
comparing the proposed point cloud to the at least one depth maps;
determining at least one error metrics based on the comparison; and
estimating the scaling based on the proposed scale with the lowest at least one error metrics.

2. The method of claim 1,
wherein generating the at least two up to scale camera poses and the up to scale point cloud comprises inputting the plurality of images into a structure from a motion algorithm,
wherein the structure from the motion algorithm is arranged to output the at least two up to scale camera poses for the at least one color sensors.

3. The method of claim 1,
wherein comparing the proposed point cloud to the at least one depth maps comprises:
projecting the proposed point cloud to the views of the at least one depth sensors using the proposed camera poses; and
evaluating a plurality of depth-based errors between depth values in the at least one depth maps and corresponding depth values resulting from projecting the proposed point cloud, wherein determining one of the error metrics is based on the plurality of depth-based errors.

4. The method of claim 1, wherein comparing the proposed point cloud comprises:
projecting the proposed point cloud to the views of the at least two color sensors using the at least two proposed camera poses so as to generate projected points;
identifying depth map values of the at least one depth maps corresponding to feature points of the proposed point cloud;
projecting the depth map values to the views of the at least two color sensors using the at least two proposed camera poses; and
evaluating a plurality of pixel-based errors, in an imaging plane of each of the at least two color sensors between the pixel coordinates resulting from projecting the depth map values and the pixel coordinates resulting from projecting the proposed point cloud,
wherein determining one of the error metrics is based on the plurality of pixel-based errors.

5. The method of claim 1,
wherein estimating the scaling of the at least two up to scale camera poses and up to scale point cloud comprises, for each proposed scale:
determining whether one or at least one projected points in the projected point cloud are occluded in the view of any one of the depths sensors and/or the at least two color sensors; and
based on a particular projected point being occluded, weighting the error corresponding to the particular projected point lower in the at least one error metrics.

6. The method of claim 3,
wherein estimating the scaling of the at least two up to scale camera poses and up to scale point cloud further comprises, for each proposed scale:
determining whether one or at least one projected points in the projected point cloud are occluded in the view of any one of the depths sensors and/or the at least two color sensors; and
based on a particular projected point occluded, weighting the error corresponding to the particular projected point lower in the at least one error metrics,
wherein determining whether at least one projected points in the projected point cloud are occluded comprises determining whether the depth-based error between the depth of at least one of the projected points and the depth of the depth map exceeds a depth-based occlusion threshold.

7. The method of claim 4,
wherein estimating the scaling of the at least two up to scale camera poses and up to scale point cloud further comprises, for each proposed scale:
determining whether one or at least one projected points in the projected point cloud are occluded in the view of any one of the depths sensors and/or the at least two color sensors; and
based on a particular projected point being occluded, weighting the error corresponding to the particular projected point lower in the at least one error metrics, and
wherein determining whether at least one projected points in the projected point cloud are occluded comprises determining whether the pixel-based error between the pixel coordinates of the projected points and the pixel coordinates of the depth map points exceeds a pixel-based occlusion threshold.

8. The method of claim 5,
wherein determining whether at least one projected points in the projected point cloud are occluded comprises:
identifying projected points within a local neighborhood of at least one central projected points; and
determining whether the depth-based error and/or the pixel-based error exceed a neighborhood threshold, wherein the neighborhood threshold is optionally dependent on the depth of the identified projected points in the local neighborhood for each local neighborhood.

9. The method of claim 5,
wherein determining whether at least one projected points in the projected point cloud are occluded comprises:
identifying, for each projected point, a pixel color for each view of the at least one depth sensors and/or the at least two color sensors based on the plurality of images for each projected point; and
comparing the pixel colors from each view for each projected point.

10. The method of claim 1, further comprising:
generating a second point cloud using the at least one depth maps;
for each proposed scale:
projecting the second point cloud to the views of the at least one depth sensors using the at least two proposed camera poses; and
evaluating a second plurality of depth-based errors between depth values in the at least one depth maps and the corresponding depth values resulting from the projection of the second point cloud,
wherein determining one of the error metrics is based on the second plurality of depth-based errors.

11. A computer program stored on a non-transitory medium, wherein the computer program when executed on a processor performs the method as claimed in claim 1.

12. A system, the system comprising:
a hybrid camera array comprising at least two color sensors and at least one depth sensors; and
a processor circuit and a memory circuit, wherein the memory is arranged to store instructions for the processor circuit,
wherein the processor circuit is arranged to obtain a depth map from each of the at least one depth sensors,
wherein the processor circuit is arranged to obtain a plurality of images from the at least two color sensors,
wherein the processor circuit is arranged to generate at least two up to scale camera poses for the at least two color sensors, wherein the processor circuit is arranged to an up to scale point cloud using the plurality of images,
wherein the processor circuit is arranged to estimate a scaling of the at least two up to scale camera poses,
wherein the processor circuit is arranged to estimate up to scale point cloud using the at least one depth maps,
wherein the estimating comprises:
wherein the processor circuit is arranged to obtain a plurality of proposed scales,
wherein the processor circuit is arranged to calculate at least two proposed camera poses and a proposed point cloud by applying the proposed scale to the at least two up to scale camera poses and up to scale point cloud respectively for each proposes scale,
wherein the processor circuit is arranged to compare the proposed point cloud to the at least one depth maps for each proposed scale,
determining at least one error metrics based on the comparison for each proposed scale,
estimating the scaling based on the proposed scale with the lowest at least one error metrics for each proposed scale.

13. The system of claim 12,
wherein the processor circuit is arranged to generate the at least two up to scale camera poses,
wherein the processor circuit is arranged to generate the up to scale point cloud by inputting the plurality of images into a structure from a motion algorithm,
wherein the structure from the motion algorithm is arranged to output the at least two up to scale camera poses for the at least two color sensors.

14. The system of claim 12,
wherein the processor circuit is arranged to generate the at least two up to scale camera poses,
wherein the processor circuit is arranged to generate the up to scale point cloud by inputting the plurality of images into a structure from a motion algorithm,
wherein the structure from the motion algorithm is arranged to output the at least two up to scale camera poses for the at least two color sensors,
wherein the structure from the motion algorithm is arranged to output the up to scale point cloud.

15. The method of claim 1,
wherein generating the at least two up to scale camera poses and the up to scale point cloud comprises inputting the plurality of images into a structure from a motion algorithm,
wherein the structure from the motion algorithm is arranged to output the at least two up to scale camera poses for the at least one color sensors,
wherein the structure from the motion algorithm is arranged to output the up to scale point cloud.

* * * * *